June 19, 1962 M. J. DUMAIRE 3,040,302

SATURABLE MAGNETIC CORE CIRCUITS FOR HANDLING BINARY CODED INFORMATIONS

Filed Sept. 19, 1957

INVENTOR.
MARC JEAN DUMAIRE
BY
[signature]
ATTORNEY

United States Patent Office 3,040,302

Patented June 19, 1962

3,040,302

SATURABLE MAGNETIC CORE CIRCUITS FOR HANDLING BINARY CODED INFORMATIONS

Marc Jean Dumaire, Suresnes, France, assignor to Societe d'Electronique et d'Automatisme, Courbevoie, Seine, France Filed Sept. 19, 1957, Ser. No. 684,965
Claims priority, application France Sept. 24, 1956
10 Claims. (Cl. 340—174)

The present invention is an improvement in or relating to the subject matter of co-pending application No. 590,931. The co-pending application describes an improved system for transferring coded information through electrical circuits including magnetic cores having a hysteresis loop of substantially rectangular shape for registering or storing such information.

The present invention relates to the storing of binary code information in magnetic core circuits by temporarily registering the digits on cores of substantially rectangular hysteresis cycle and by controlling the transfers of these registrations along a cascade of cores by means of interconnecting networks, comprising each at least one winding of a digit bearing and a digit receiving core, respectively.

A more specific object of the invention is to improve the efficiency of such magnetic core circuits such as described and claimed in co-pending application No. 590,931.

It is a further object of the invention to provide a magnetic core circuit of the type specified operating with only one pair of magnetic cores for each information bit transmitted therethrough.

Another object of the invention is to provide a network connected to the write-in winding to control the change in magnetic condition, that is to say that such a member is provided with means for automatically limiting the current.

A more specific object of the invention is a current limiter in the form of a magnetic core element, of a material having a substantially rectangular hysteresis cycle and provided with two windings, one being serially inserted in the interconnecting network concerned and the other being supplied with an appropriate control current which advantageously though not necessarily may be one of the currents controlling the transfers of information bits.

According to a further feature of the invention, a magnetic core circuit of the kind specified is mainly characterized in that each interconnecting network includes a current absorbing device to limit the back-current derived from the read-out operation affecting the core having its write-in winding in the network, the current absorbing device consisting preferably of a saturable magnetic core having one winding serially inserted in the network and a control winding to apply a control current.

These and other objects of the invention will be more fully described with reference to the accompanying drawings, wherein.

Figure 4:
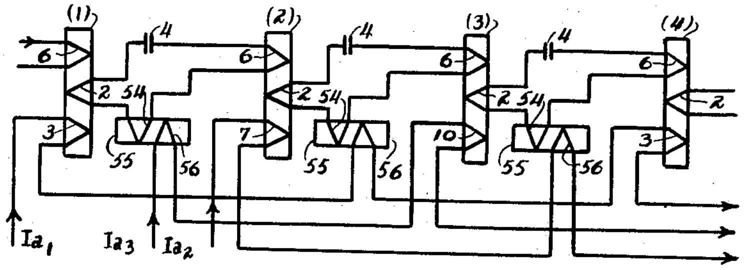
FIG. 4 shows a circuit of the type shown in FIG. 1, embodying certain principles of the invention, with the control currents remaining as shown in FIG. 3.
Figure 6:
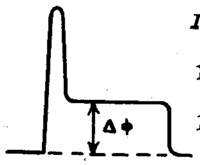

FIG. 6 indicates the change in magnetic flux within at least some of the cores of FIG. 4 during operation.

Figure 7:
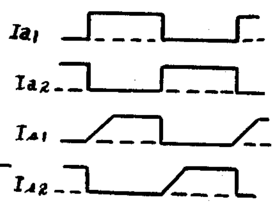

FIG. 7 shows sets of control currents which may be used in alternative arrangements of magnetic core circuits according to the invention.

Figure 8:
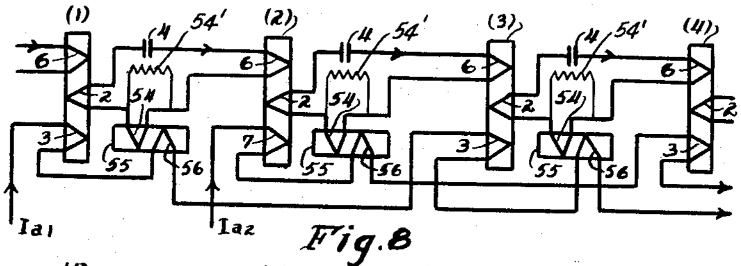
Figure 9:
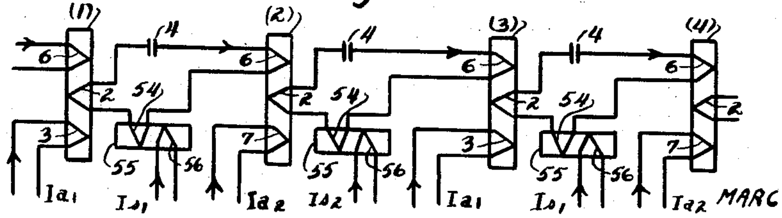

FIG. 8 shows such an alternative circuit operating with one pair of the control currents shown in FIG. 7, and FIG. 9 shows another alternative circuit operating with the complete set of control currents shown in FIG. 7.

Figure 1:
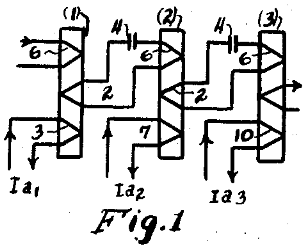
FIG. 1 shows a portion of a magnetic core circuit as described in the co-pending application.
Figure 2:
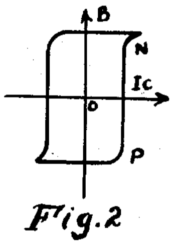
FIG. 2 shows an idealized hysteresis cycle of cores used in such circuit.
Figure 3:
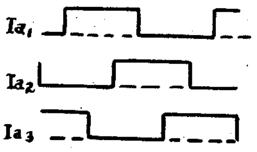
FIG. 3 illustrates sets of control currents applied to operate these cores.

With reference to FIG. 1, the three magnetic cores, shown at (1), (2) and (3), respectively consist of ferromagnetic material or the like having a hysteresis cycle of magnetization substantially as shown in the idealized graph of FIG. 2, and which is sufficiently close to explain operation. Cores (1), (2) and (3) are each provided with three windings, a write-in winding 6, a read-out winding 2, and a control winding 3, 7 and 10 respectively. Control windings 3, 7 and 10 are arranged to receive control currents $I_{a1}$, $I_{a2}$ and $I_{a3}$ respectively, relatively phase shifted with respect to the time as shown in the graph of FIG. 3. These three control currents constitute a three-phased current system, each current lagging by 120° with respect to the preceding current.

Each core may present two stable magnetization conditions, referred to as N and P in FIG. 2, and corresponding to negative and positive remanent induction conditions of the magnetic material. Each core will pass from one of these conditions to the other upon the application of a current which is at least equal to the coercitive current and which is applied in suitable direction to write-in winding or control windings. It will be assumed in the present disclosure that each core receiving on this write-in winding an information bit representing the digital value 1 will be brought to its P condition. The N condition will prevail for each information bit representing the digital value 0, or no information bit at all. The control current for each of the cores is of such direction that it will produce an N condition if its condition at the time of such current application was P.

The read-out winding 2 of each core is serially connected with the write-in winding of the next following core through a series condenser 4, if desired, as stated in the co-pending specification, with a series resistor for damping purposes.

The relative dimensioning of windings and condenser has been fully disclosed in the said application and, therefore, need not be specified.

The principle of operation may be summarized as follows:

If core (3) is assumed to be in N condition and core (1) in P condition, the core (2) being also in N condition, the "positive" wave of control current $I_{a1}$ caused core (1) to change its magnetic condition to P. The current from read-out winding 2 of core (1) charges condenser 4, and after this charge, condenser 4 will discharge through write-in winding 6 of core (2) which is thus brought to P condition before the "positive" wave of control current $I_{a2}$ occurs. The passage from charge to discharge of series condenser 4 will occur automatically in the interconnecting network and, during this time interval controlling core (2), core (3) will be blocked to its N condition thereof by the positive wave of control current $I_{a3}$. The same control current may have first brought core (3) from P to N if core (3) was in its P condition. Core (2) was free to be actuated to reverse its magnetic conditions because control current $I_{a2}$ was at its lower value during the time interval in which one information bit was transferred, thus representing the digital value 1 according to the above-stated convention of binary digit representation.

When the "positive" wave of control current $I_{a2}$ occurs, this current will act to charge the series condenser 4 on both sides of magnetic core (2). Each condenser 4 acquires a temporary charge equal to $\frac{1}{2}(I_{a2}-I_c).\phi$, with $I_c$ denoting the coercitive current value of the cores and $\phi$ the magnetic flux change within a core passing from P to N. Core (1) is not affected because the control current $I_{a1}$ on this core is still at its higher value, thus opposing any change of its magnetic state. This apparently means that one-half of the supplied energy is lost.

As has been demonstrated in the co-pending application, the value of a positive wave of control current must be of the order of five times the value of the coercitive current for each core. As a result, a great portion of energy supplied is useless and the efficiency of the current must be improved, as will be achieved in accordance with the invention.

It is further apparent that such a magnetic core circuit must include three magnetic cores for each information bit transmitted therethrough since for a transfer of one digit 1 from one core to the next following, the third core, following the receiving core, must be maintained at its N condition. Energy loss, therefore, would be reduced if, instead of requiring three cores per information bit which is also achieved in accordance with the invention.

Referring now to FIG. 4, such current limitation or absorption is achieved by a magnetic core 55 having a winding 54 serially connected in the corresponding interconnecting network and also having a control winding 56. Control winding 56 between cores (2) and (3) receives control current $I_{a1}$ of FIG. 3; control winding 56 inserted between cores (3) and (4) receives control current $I_{a2}$; and control winding 56 inserted between cores (1) and (2) receives control current $I_{a3}$.

The operation may be explained as follows:

At the time instant when control current $I_{a2}$ reaches one of its positive waves, core (2) being in P condition, core 55 supplied with control current $I_{a3}$ is in N condition but at this time control current $I_{a3}$ is at its lower value, or on its negative wave. When core (2) changes its condition from P to N under control of current $I_{a2}$, core 55 interconnecting cores (1) and (2) will be so controlled by the resulting current $I_{a2}$ returning from core (2) that its condition will change from N to P. On the other hand, core 55 interconnecting cores (2) and (3) will be maintained at N by current $I_{a1}$ which at this time interval is on its positive wave, and the resulting current $I_{23}$ flowing through the network will not affect its N condition.

The currents have the following relations:

(i) $$I_{23}=I_{a2}-I_c-I_{12}$$

and the energy transmitted to condenser 4 of the network interconnecting cores (2) and (3) is as follows:

(ii) $$W_{12}=(I_{a2}-I_c-I_{12}).\phi$$

Current $I_{12}$, $I_{23}$ . . . are the back-flow currents and not shown in the drawing.

Consequently, by providing winding 54 of each core 55 with an appropriately high number of turns, any current of the $I_{12}$ type may be made small. Instead of dividing the energy delivered to core (2) equally between the networks interconnecting cores (1) and (3), as in the case of FIG. 1, the main part of this energy will be applied to the network interconnecting cores (2) to (3). Thus, it becomes possible to reduce the amount of energy required for the operation of the circuit. If, for instance, $I_{12}$ is limited to $I_c$ by a complete change from N to P in the condition of core 55 in the network interconnecting cores (1) and (2), this energy $W_{23}$ becomes:

(iii) $$W_{23}=(I_{a2}-2.I_c).\phi$$

In order to obtain change-over in the condition of core (3), one-half of $W_{23}$ must at least be equal to $I_c.\phi$. This means that (iv) $$I_{a2}\geqslant 4.I_c$$

while in the arrangement of FIG. 1, it had to be (v) $$I_{a2}\geqslant 5.I_c$$

Consequently, the overall energy supplied to the circuit will be reduced by 20% as the above-defined conditions will be repeated in all the transfer operations of the device.

It may be noted that the core 55 which has been brought from N to P in the case concerned, will be reset to N by the action of control current $I_{a3}$. This does not involve additional energy to be introduced in the supply of the circuit because this control current must in any case be fed to the circuit to actuate the next information bit transfer from core (3) to core (4).

The number of turns of each winding 54, of course, must be higher than the number of turns of windings 2 and 6 so as to prevent an information bearing core from being actuated during a period in which an information bit is transferred between a pair of cores following that information bearing core in the cascade of cores. The ampere-turns of control winding 56 must be higher than those resulting from the discharge of condenser such as indicated at 4.

Finally, the current produced by the reset to N condition of a core 55 under control of a current applied thereto, must not be such as to substantially charge the corresponding condenser 4. This will prevent interference with the normal transmission of the digits along the cascade core of information registering cores.

In addition to reducing the energy supplied to an arrangement such as shown in FIG. 4, the invention has the further advantage that the circuit may be operated at a higher frequency. The time interval required for changing the condition of an information bearing core is actually reduced since, in the network interconnecting the core concerned with the next following core, the time constant for transferring an information bit between the cores is determined by only one condenser.

Figure 5:
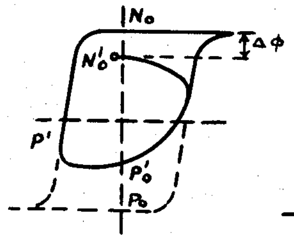
FIG. 5 shows a hysteresis cycle explaining certain points of operation of a circuit such as illustrated in FIG. 4.

It may further be noted that the change-over of any core 55 actually charges to a certain extent only the condenser 4 of that series circuit or network to which its winding 54 is connected. The hysteresis cycle traversed by such a core 55 may be considered as defined in the graph of FIG. 5. The first changeover occurs from the $N_0$ condition to a condition $P^1$; when the current is zero, the core returns to $P_0^1$. Condenser 4 then discharges and brings core 55 from $P_0^1$ to $N_0^1$. The control current through the winding 56 of the core 55 concerned will then reset to $N_0$. The variation of magnetic flux required for each a reset is thus reduced to $\Delta\phi$ as shown.

FIG. 6 shows the curve appearing on an oscilloscope when testing the variation of flux in a magnetic core 55 before the reset control current is applied. The ascending line corresponds to the change from $N_0$ to $P^1$, the descending line to the change from $P^1$ to $N_0$. Thus, apparently, the only remaining variation of flux must be of reduced value $\Delta\phi$.

A further advantage of the invention is in the reduction of the number of information bearing cores from three to two per information bit. This will be explained with respect to the arrangements of FIGS. 8 and 9. The reason why such a reduction is possible is apparent from the circuit of FIG. 4 and its operation. It has been stated and demonstrated that when core (2), for instance, changes its condition, the current to core (1) is limited and incapable of acting to change its condition. It is then useless to ensure a blocking of core (1) by means of a special portion of its control current occurring during a changeover of core (2); and this applies to all the cores in the cascade arrangement. As a result of such a blocking action becoming unnecessary, core (1) may then receive a fresh information bit from the core preceding. Consequently, only two control currents are required, for instance, control $I_{a1}$ and $I_{a2}$ such as shown in FIG. 7 in phase opposition to one another. This relates to the embodiment illustrated in FIG. 8 adapting the circuit of FIG. 4 to a two-core per digit operation.

In FIG. 8, each winding 56 of a core 55 is supplied with the control current applied to the control winding of the core where the readout winding 2 is connected to winding 54 of the same core 55. Considering for instance core (2) in its P condition, when control current $I_{a2}$ reaches a positive and control current $I_{a1}$ a negative wave. Core 55 of the network interconnecting cores (1) and (2) changes its magnetic condition as stated above. Condenser 4 of the network interconnecting cores (2) and (3) is charged by a current of the direction indicated in the drawing by an arrow and opposing the reset current produced in winding 54 of core 55 of the same network and then actuated by reset control current $I_{a2}$. This opposing current, of course, is much lower than the current charging condenser 4. At the discharge of condenser 4, core (3) will be set to condition P from condition N as required.

In order to prevent the reset current for core 55 from fully opposing the current charging a condenser, it may be of advantage to actuate cores 55 from a separate group of control currents, such as shown at $I_{s1}$ and $I_{s2}$ in FIG. 7.

This is achieved as shown in FIG. 9 by separate inputs for the control windings of the information bit registering cores and the limiting cores. The waveform of currents $I_{s1}$ and $I_{s2}$ explains the advantage thus obtained. In contrast to the operation of FIG. 8, there is no substantial current opposition. Each control current for cores 55 reaches its high level only after a time interval sufficient for the full charging of condensers 4.

Similarly, and for the same purpose, it may be sufficient to shunt each one of windings 54 by a resistance 54' delaying the change-over of the corresponding core 55 when such a change-over is due to occur. On the other hand apparently, the saturation of such a core 55 is maintained as before during the time interval of discharge of the condenser 4 concerned.

What is claimed is:

1. In a saturable magnetic core circuit for handling serially coded binary information, a number of magnetic information carrying cores capable of assuming bistable states of magnetic remanence, each having at least one read-out and one write-in winding, successive magnetic cores being interconnected with the insertion of a series condenser and of an impedance means limiting the back current and having a value varying as a function of the current passing therethrough, the condenser being connected in series with said windings and the impedance means forming a transfer loop in which information is shifted from one core to the next, and in which the back-current derived from reading-out the core having its write-in winding in said loop is limited under control of said reading-out; said impedance means comprising a saturable magnetic core having one winding serially inserted in said interconnection and of a higher number of turns than the read-out and write-in windings associated therewith.

2. A combination according to claim 1 wherein each of the magnetic core is provided with a control winding, a first mult-phased control current system being recurrently applied to said information carrying cores, and a second mult-phased control current system being recurrently applied to said impedance means.

3. A combination according to claim 2, wherein each of said current systems is triphased, the second system having a phase lag of 240° with respect to the first system as seen from the input of said successive interconnected cores.

4. A combination according to claim 2, wherein each of said current systems is diphased and has a zero phase-shift with respect to the other.

5. A combination according to claim 4, wherein both current systems are of identical wave form and a shunt resistor is connected across each winding of said saturable magnetic cores comprised in said impedance means and inserted in said interconnections.

6. A combination according to claim 4, wherein the second control current system has a wave form with predeterminately lesser abrupt forefronts than the current wave form of said first control current system.

7. In a magnetic core circuit, a number of magnetic cores capable of assuming bistable states of magnetic remanence, including a succession of cores and closed loops interconnecting successive cores; said loops including each write-in and read-out winding means associated with successive cores, capacity means and third winding means, said third winding means forming an impedance means limiting the back current and having a value varying as a function of the current itself passing therethrough all said means being connected in series; the third winding means being connected with another one of said number of cores.

8. Circuit according to claim 7, wherein said third winding means has more turns than said write-in and read-out windings.

9. Circuit according to claim 7, wherein all said cores are provided with control windings; and means for energizing the control windings of said successive cores and of said other cores, separately; the energizing means for the control windings of said successive cores being out of phase with respect to the energizing means for the control windings of said other cores.

10. Circuit according to claim 7, wherein all said cores are provided with control windings; and means for energizing the control windings of said successive cores and of said other cores, separately; the energizing means for the control windings of said successive cores providing a less abrupt wave front than the energizing means for the control windings of said other cores.

References Cited in the file of this patent

UNITED STATES PATENTS

| | | |
|---|---|---|
| 2,652,501 | Wilson | Sept. 15, 1953 |
| 2,683,819 | Rey | July 13, 1954 |
| 2,708,722 | An Wang | May 17, 1955 |
| 2,781,503 | Saunders | Feb. 12, 1957 |
| 2,847,659 | Kaiser | Aug. 12, 1958 |
| 2,866,178 | Lo et al. | Dec. 23, 1958 |
| 2,886,801 | Briggs | May 12, 1959 |
| 2,894,151 | Russell | July 7, 1959 |
| 2,907,987 | Russell | Oct. 6, 1959 |